United States Patent [19]
Kaiser et al.

[11] Patent Number: 4,564,234
[45] Date of Patent: Jan. 14, 1986

[54] COVER FOR MIRROR FOR SUN VISOR, PARTICULARLY FOR AUTOMOBILES

[75] Inventors: Klaus-Peter Kaiser, Wermelskirchen; Lothar Viertel, Saarlouis, both of Fed. Rep. of Germany

[73] Assignee: Gebr. Happich GmbH, Fed. Rep. of Germany

[21] Appl. No.: 694,438

[22] Filed: Jan. 24, 1985

Related U.S. Application Data

[63] Continuation of Ser. No. 509,313, Jun. 30, 1983, abandoned.

[30] Foreign Application Priority Data

Jul. 20, 1982 [DE] Fed. Rep. of Germany ............... 82206295[U]

[51] Int. Cl.⁴ .............................................. B60J 3/00
[52] U.S. Cl. .............................. 296/97 H; 160/231 R
[58] Field of Search .......................... 296/97 H, 97 R; 362/135, 136, 137, 140; 160/231 R, 235, 26, 27, 28

[56] References Cited

U.S. PATENT DOCUMENTS

| | | | |
|---|---|---|---|
| 1,295,712 | 2/1919 | Drew | 160/231 R |
| 1,852,323 | 4/1932 | Long | 160/231 R |
| 2,054,499 | 9/1936 | Florman | 160/231 R |
| 2,107,997 | 2/1938 | Horseley | 160/231 R |
| 2,861,277 | 11/1958 | Herman | 160/235 |
| 3,926,470 | 12/1975 | Marcus | 296/97 H |
| 4,364,597 | 12/1982 | Viertel et al. | 296/97 H |

FOREIGN PATENT DOCUMENTS 2453042 10/1980 France .

*Primary Examiner*—Robert R. Song
*Attorney, Agent, or Firm*—Ostrolenk, Faber, Gerb & Soffen

[57] ABSTRACT

A sun visor for automotive vehicles includes a sun visor body with a mirror on one surface and a cover which is selectively movable to expose and cover up the mirror. The cover is slidable past one edge of the mirror and into a recess defined in the visor body. The length of the recess is shorter than the length of the cover when it is extended. The cover is deformable to fit into the reduced size recess. The cover forms a loop in that recess, or is wound up on a shaft in that recess, etc. The cover is comprised of flexible material or it comprises a series of adjacent slats which are articulatedly connected for deflecting with respect to each other. The cover is guided for its movement in lateral guides.

11 Claims, 9 Drawing Figures

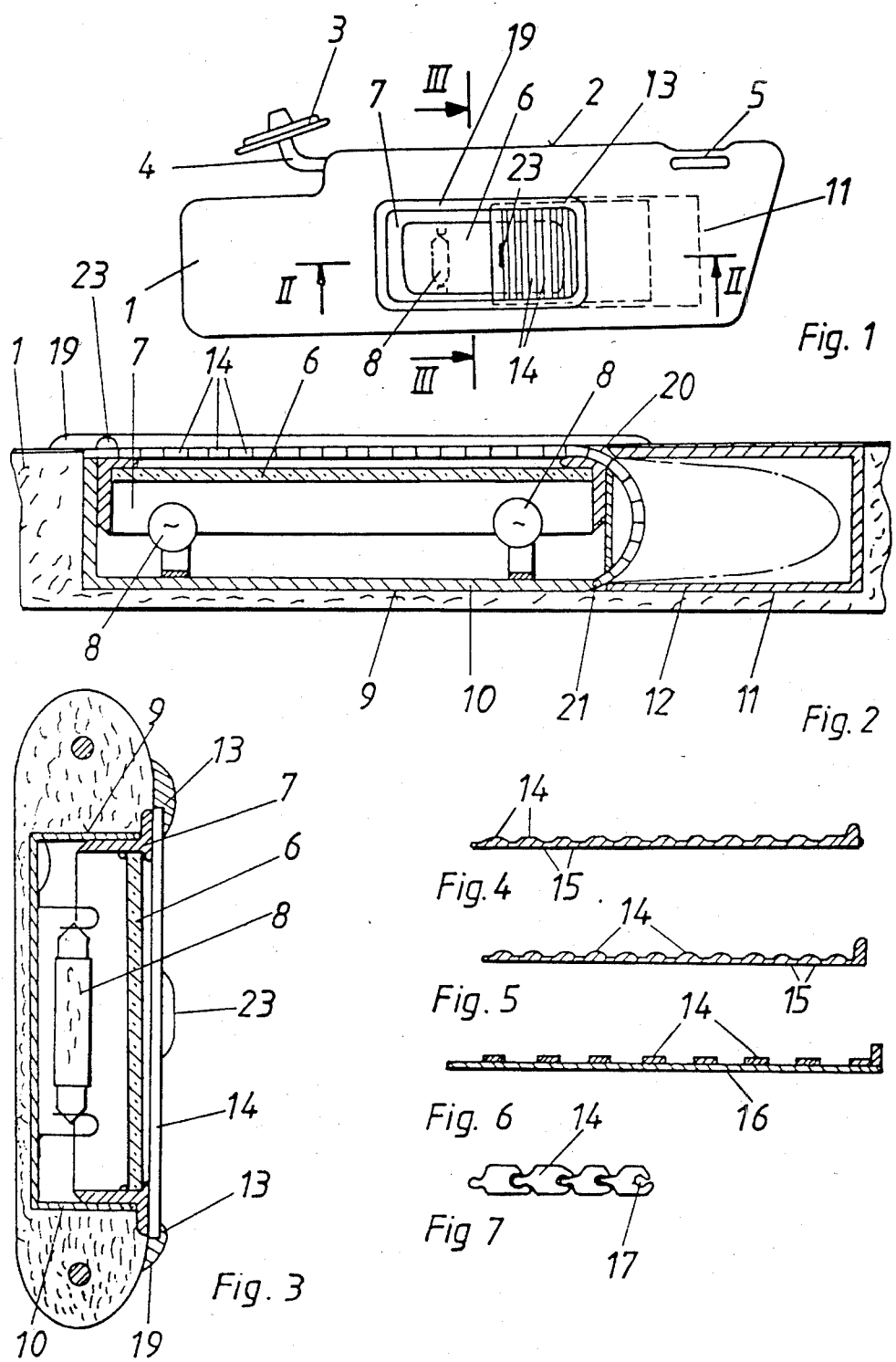

COVER FOR MIRROR FOR SUN VISOR, PARTICULARLY FOR AUTOMOBILES

RELATED APPLICATIONS:

This is a continuation of Application Ser. No. 509,313 filed on June 30, 1983 now abandoned in the name of Klaus-Peter Kaiser and Lothar Viertel for COVER FOR MIRROR FOR SUN VISOR, PARTICULARLY FOR AUTOMOBILES.

BACKGROUND OF THE INVENTION

The present invention relates to a sun visor, particularly for automobiles, and more particularly relates to the cover over a mirror on the sun visor body. The sun visor body has a mirror. A cover over the mirror is contained within lateral guides and can be inserted into a recess in the sun visor body, which recess adjoins one edge of the mirror.

Automobile sun visors are increasingly equipped with mirrors, which are often provided with covers for various reasons such as to reduce the danger of glare or dazzle and to protect occupants of the vehicle against injury. Known mirror coverings include hinged covers pivoted to the body of the sun visor above or below the mirror or sliding covers which can be inserted into a recess in the sun visor body which adjoins a vertical edge of the mirror. Slidable mirror coverings are considered superior to hinged covers since the former do not have to be swung out of the plane of the body of the sun visor in order to open and close them. On the other hand, slidable covers have an inherent disadvantage since they require a cover reception space alongside the mirror, and that space must have dimensions corresponding to the area of the mirror. Due to the supports, and the like, which are usually embedded in the sun visor body, there is only a limited region within the body where a recess can be provided to receive a sliding cover. To accommodate slidable mirror coverings, it is necessary to equip their sun visors with relatively small mirrors. However, this has met with increasing disapproval on the part of the customers.

SUMMARY OF THE INVENTION

It is an object of the present invention to be able to equip sun visor bodies with mirrors having an area that satisfies the desires of the customers.

It is another object of the invention to provide a cover for such a mirror.

A further object is to provide a cover for the mirror, which need not be moved out of the plane of the sun visor body, in order to cover and uncover the mirror.

According to the invention, the length of the recess in the sun visor body for receiving the cover over the mirror is substantially less than the extended length of the cover when it is covering the mirror. The cover is deflectable into the smaller recess alongside an edge of the mirror and the cover deforms to fit within that small size recess. In one embodiment, the cover comprises slats which are articulated to and arranged alongside of each other and which extend transverse to the direction of sliding of the cover. The cover may alternatively be capable of being deformed into a loop for insertion into the recess or may be adapted to wind up within the recess like a roller blind or else it may be adapted to be deflected toward the back of the mirror. Regardless of which of these alternatives is adopted, the cover of the mirror requires extremely little space to accommodate it when not in use, and the space saved can be added to the length of the mirror.

The cover over the mirror may comprise a roller blind windable on a winding shaft arranged within the recess in the visor body. In this case, the cover may be a strip of textile which can be wound up on the winding shaft, a strip of plastic possibly flocked or backed by a strip of textile, or a strip of metal foil. Furthermore, as with known window shades, the winding shaft may have an automatic wind-up system. The roller shade may be secured against unintended winding-up while in the position in which it covers the mirror by a hook, magnet, or the like, provided at its free end.

A sun visor for automobile vehicles, comprising:
a sun visor body having first and second opposed major surfaces spaced apart by a distance which is substantially smaller in dimension than the dimensions of said major surfaces, said distance defining the thickness of said visor body;
a mirror housed in said visor body and being viewable through an opening formed in said visor body;
a cover housed in said visor body and being movable between a first position wherein it covers said mirror so that said mirror cannot be viewed through said opening and a second position wherein it is withdrawn from said mirror so that said mirror can be viewed through said opening;
non-exposed chamber located within said visor body adjacent said mirror for accommodating said cover in said chamber when said cover is in said second position; and
means for guiding said cover for movement between said first and second positions, said means, said cover and said chamber cooperating to cause said cover to assume a u-shaped configuration, as viewed along a cross section of said visor body which is taken along the thickness direction of said visor body, in said chamber when said cover is in said second position, said cover including a fixed end and a movable end, said fixed end being stationarily connected to a portion of said chamber adjacent said mirror, said movable end being manually movable past said mirror.

Other objects and features of the inventon are described below with reference to the accompanying drawings.

BRIEF DESCRIPTION OF THE DRAWINGS

FIG. 1 is an elevational view of a sun visor including the invention;

FIG. 2 is a cross-section along the line II—II of FIG. 1, and shown on a larger scale;

FIG. 3 is a cross-section along the line III—III of FIG. 1, also shown on a larger scale;

FIGS. 4 to 7 show fragmentary cross-sections along the line II—II of various covers over the mirror on the sun visor body;

DETAILED DESCRIPTION OF THE PREFERRED EMBODIMENTS

Figure 8:
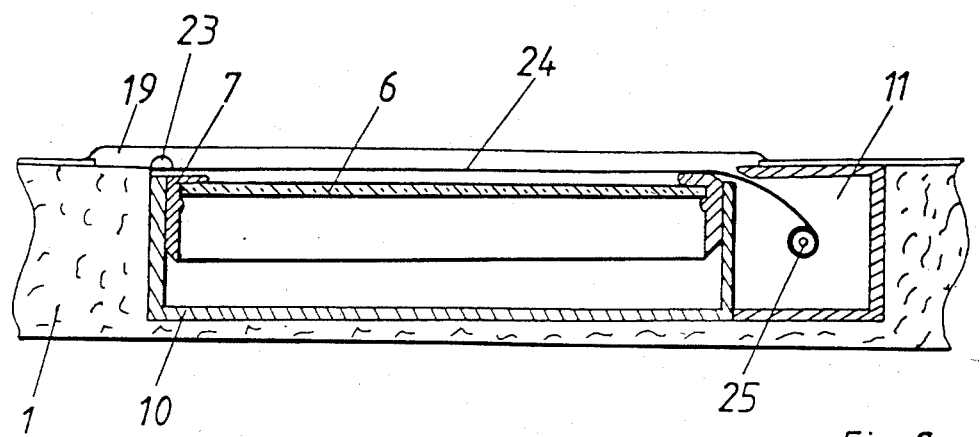
FIG. 8 is a cross-section along the line II—II of FIG. 1 showing another embodiment to that shown in FIG. 2.

Referring to FIG. 1, a sun visor includes a sun visor body 1. At one end region of its upper longidutinal edge 2, the body has a swivel support, comprising a housing 3 and sun visor shaft 4. An outer support shaft 5 is arranged at the other end region of the edge 2 and can be removably inserted into the outer support housing (not shown). There is a mirror 6 which is seated in a frame 7. The mirror can be illuminated by at least one incandescent bulb 8 serving as source of light. The bulb is behind the mirror and the frame of the mirror permits light to shine past the periphery of the mirror and illuminate the face of a person looking into the mirror. Finally, there is a cover which is movable to selectively cover and uncover the mirror, as described below.

Referring to FIGS. 2 and 3, the sun visor body 1 has a chamber-like recess 9 defined in it, which is open toward one wide side of the body. A rectangular box 10 is arranged within the recess. The box 10 supports the frame 7, for instance by means of clips (not shown). The frame 7, which is preferably made of a light-transmitting material, holds the mirror 6.

Adjoining one end of the recess 9 and thus of the mirror 6, there is a recess 11 containing a box 12 which is open toward the mirror frame 7.

The cover for the mirror 6 is comprised of slats 14 which are articulated to each other. This enables the cover to deflect into the recess 9. The slats extend, from end to end, between and their ends are contained in lateral guides 13. The guides may be developed in a frame 19.

According to the embodiments shown in FIGS. 4 and 5, the slats 14 may optionally be formed of a length of a profiled plastic extrusion or of a plastic injection molding and may be connected together by film hinges 15. The slats 14 may be of square, rectangular, frustoconical (FIG. 4), oval or semi-round (FIG. 5) cross-section.

In the embodiment shown in FIG. 6, each of the slats 14 comprises a length of a profiled extrusion of plastic or of metal, and particularly a light metal, or else of a length of rolled profiled sheet metal. The slats 14 in this case are held together by a textile backing 16, a plastic foil or plastic tapes.

In the embodiment shown in FIG. 7, the slats 14 are developed as edge profiled, extruded lengths. Each slat 14 has on one longitudinal edge an undercut partially circular groove 17 and on the opposite longitudinal edge a mushroom-head longitudinal bead 18. The slats 14 can be pivotally fastened to each other by inserting the longitudinal bead 18 on one slat into the circular groove 17 in the adjacent slat.

The cover, formed by the slats 14 and received between the lateral guides 13, has an extended length when it is out of the recess 11 which is sufficient for the cover to completely cover mirror 6 and frame 7 and to block them from the view of the observer. However, when the mirror 6 and the lighting frame 7 are to be exposed to view, this is simply accomplished by displacing the cover toward the recess 11 past the adjacent edge of the mirror. The slats 14 then slide through a slot opening 20 into the recess 11 and/or the housing 12 arranged in that recess. As a result of the pivoted articulated connection of the individual slats 14 to each other, the cover can be arranged, within the recess 11 or housing 12 with considerably reduced length as compared with its extended length. This is accomplished, for example, by the deformation of the cover into a loop. See the dash-dot line in FIG. 2. In this case, the free end of the cover in FIG. 2 is fastened at 21 to the lower edge at the bottom of the housing box 10, which contains the mirror 6 and frame 7.

One variant of the invention, which has not been shown, comprises winding the interconnectd slats 14 on, for instance, a reel within the recess 11.

Figure 9:
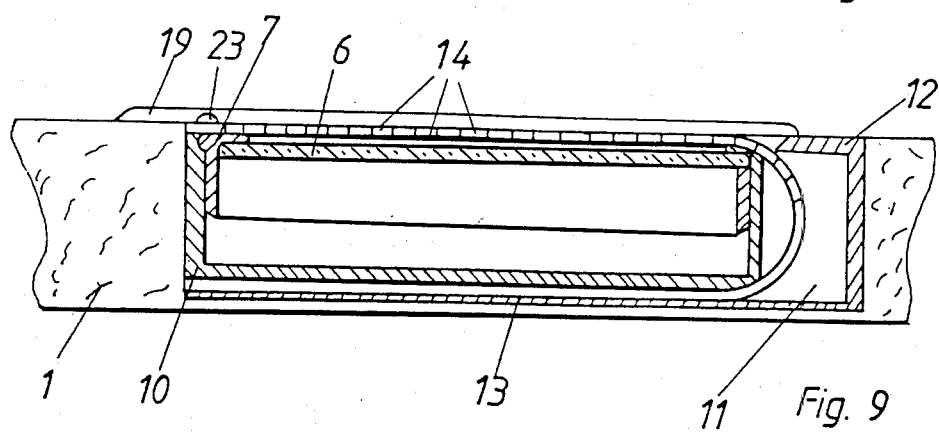
FIG. 9 is the same type of view of a further embodiment of the invention.

FIG. 9 shows an embodiment of the invention in which the cover, comprised of pivotally interconnected slats 14, is received in lateral guides 13. The guides 13 extend initially in a straight line along the viewing side of the mirror. They then curve in semi-circular shape through the recess 11. Thereafter, they extend parallel to the rear of the mirror. The recess 11 in this case also extends behind the rear side of the mirror. In this embodiment, the mirror surface can be relatively very large, since only a very small amount of space is required for containing the mirror cover.

In all the embodiments described above, the cover is provided with a graspable handle 23 for its operation.

FIG. 8 shows a special embodiment in which the mirror cover is in the form like a roller blind, with a roller shade 24 and a winding shaft 25. The roller shade 24 may comprise a thin strip of textile or a plastic strip or else a metal foil. The winding shaft 25 is preferably provided with an automatic wind-up mechanism so that the roller shade can be operated in approximately the same manner as an ordinary window shade. The roller shade may have a handle 23. At the free end thereof which bears the handle 23, the shade carries lock means, such as a hook, a magnet, or the like, by which the roller shade may be hooked to the visor body to prevent the cover from opening undesirably. Developing the mirror covering as a roller blind has the advantage that when it is not used, the mirror cover can be contained within an extremely small space.

Although the present invention has been described in connection with a number of preferred embodiments thereof, many variations and modifications will now become apparent to those skilled in the art. It is preferred, therefore, that the present inventon be limited not by the specific disclosure herein, but only by the appended claims.

What is claimed is:

1. A sun visor for automobile vehicles, comprising:
    a sun visor body having first and second opposed major surfaces spaced apart by a distance which is substantially smaller in dimension than the dimensions of said major surfaces, said distance defining the thickness of said visor body;
    a mirror housed in said visor body and being viewable through an opening formed in said visor body;
    a cover housed in said visor body and being movable between a first position wherein it covers said mirror so that said mirror cannot be viewed through said opening and a second position wherein it is withdrawn from said mirror so that said mirror can be viewed through said opening;
    a non-exposed chamber located within said visor body adjacent said mirror for accommodating said cover in said chamber when said cover is in said second position; and
    means for guiding said cover for movement between said first and second positions; said means, said cover and said chamber cooperating to cause said cover to assume a u-shaped configuration, as viewed along a cross section of said visor body which is taken along the thickness direction of said visor body, in said chamber when said cover is in said second position; said cover including a fixed end and a movable end, said fixed end being stationarily connected to a portion of said chamber adjacent said mirror, said movable end being manually movable past said mirror.

2. The sun visor of claim 1, wherein the cover is articulated along its length to be able to deflect.

3. The sun visor of claim 1, wherein the guide means for the cover comprise lateral guides which support the lateral sides of the cover for sliding into and out of the non-exposed chamber.

4. The sun visor of claim 3, wherein the cover comprises a plurality of slats arranged alongside of each other and oriented transverse to the direction of sliding of the cover in the guides, and the slats being articulated to each other for deflecting with respect to each other.

5. The sun visor of claim 4, wherein the slats are connected to each other by a film hinge.

6. The sun visor of claim 4, wherein the slats comprise a plurality of individual bars which are fastened together by connecting means.

7. The sun visor of claim 6, wherein the connecting means comprise the slats being connected to each other by a flexible backing layer behind the slats.

8. The sun visor of claim 6, wherein the connecting means comprise one longitudinal edge of each slat having an enlarged head defined along that edge, and another longitudinal edge of each slat having a groove defined therein adapted for receiving the bead, and the slats being articulatedly connected to each other through the bead on one slat being received in the groove of the adjacent slat.

9. The sun visor of claim 1, wherein the cover comprises a plurality of slats arranged alongside of each other and oriented transverse to the direction of motion of the cover into and out of the chamber and the slats being articulated to each other for deflecting with respect to each other.

10. The sun visor of claim 1, wherein the cover is a single piece injection molding of plastic.

11. The sun visor of claim 1, wherein the cover is a length of a profiled plastic extrusion.

* * * * *